United States Patent Office 3,502,759
Patented Mar. 24, 1970

3,502,759
PROCESS FOR THE PREPARATION OF COMPRESSED GRAPHITE STRUCTURES
Franciszek Olstowski, Freeport, and Leonard M. Vaught, Lake Jackson, Tex., assignors to The Dow Chemical Company, Midland, Mich., a corporation of Delaware
No Drawing. Filed Mar. 30, 1966, Ser. No. 538,598
Int. Cl. C01b 31/04; B29j 5/00
U.S. Cl. 264—120                           4 Claims

ABSTRACT OF THE DISCLOSURE

This invention relates to a process for the preparation of cohered monolithic graphite structures by the steps of compressing expanded vermicular graphite to form a first compact having a density between about 0.01 gm./cc. and about 1.4 gm./cc., contacting such first graphite compact with at least one other such compact or with particulate vermicular graphite, then subjecting all of such material to a pressure of at least 30 p.s.i. to thereby form the monolithic graphite structure.

---

This invention relates to new compressed graphite structures and to their method of preparation, and more particularly relates to graphite structures prepared by the compression of vermicular graphite in a particular manner.

A form of expanded vermicular graphite is known and described in French Patent No. 1,395,964. It is likewise known that such material is malleable, i.e. capable of being shaped and formed by the application of pressure and that it may be compressed to form sheets or foils having sufficient physical strength to permit handling and use.

Such vermicular graphite may be compressed uniaxially or radially to produce integral structures having high thermal and electrical anisotropy. Biaxial compression produces a substantially reduced degree of anisotropy and triaxial or isotropic compression produces structures having little or no anisotropy. In the case of uniaxial or radial compression both the electrical and thermal resistivity are highest in the direction of compressive force and lowest in the direction perpendicular to that of the compressive force. The anisotropy ratio between the two directions increases with increasing compression up to or near the theoretical density of the graphite.

While the malleability and ease of compression of this material make it highly desirable for use in the formation of graphite structures, and particularly those having intricate shapes, heretofore the formation of relatively large graphite structures from such material has been excessively difficult. This has been due largely to the fact that the bulk density of vermicular graphite is very low and extremely large volume changes and high pressures are required to form high density graphite structures therefrom. No method has heretofore been available for forming such relatively large high density structures from vermicular graphite.

It is an object of this invention to provide a process whereby vermicular graphite may be conveniently compressed into structures of any desired size or shape. It is an additional object to provide integral graphite structures in which regions of physical, electrical and thermal properties are arranged in a laminar manner. A further object is to provide an improved and less costly process for compressing vermicular graphite into relatively large high density monolithic structures optionally having either homogeneous or heterogeneous properties. These and other objects and advantages of the present invention will become apparent from the following detailed description of the invention.

It has now been discovered that novel compressed vermicular graphite structures may be prepared by first compressing vermicular graphite into a relatively light weight compact having a bulk density of from about 0.01 to 1.4 gm./cc. and compressing this with an additional vermicular graphite source material having a maximum density about 1.4 gm./cc., e.g. one or more additional of such compacts or additional vermicular graphite itself, under sufficient pressure to produce a relatively high density compact or structure. The structures produced in this manner are monolithic and show no boundary or boundaries between the two or more light weight compacts from which they were formed.

In the first step of the present novel process vermicular graphite is compressed in one or more directions to form a relatively low density compact having a bulk density within the range of 0.01 to 1.4 gm./cc. A structure having a bulk density of less than 0.01 gm./cc. generally lacks the structural strength to permit handling of the compact and is therefore impractical. A compact having a density greater than about 1.4 gm./cc. does not permit subsequent pressure-bonding to other compacts to form a monolithic structure. An additional advantage may be gained during this preliminary compression step by compressing the vermicular graphite into a compact having a density between 0.27 and 1.4 gm./cc. and preferably between about 0.5 gm./cc. and about 1.4 gm./cc. Compression to a density within this specified range will produce a fixed anisotropy of the desired degree and direction depending upon the direction or directions of compression and such anisotropy or lack of anisotropy will remain within the laminae of the final monolithic structure which is formed from this portion of the graphite. Compacts having a density of less than about 0.27 gm./cc. have not developed their final electrical and thermal orientation and when compressed into larger structures will assume the conductivity characteristics imparted by the final compression. Where isostatic compression is employed in the first compression step, the final electrical and thermal characteristics are not usually achieved until a density of at least 0.5 gm./cc. is reached.

The next step of the process involves arranging in a desired configuration one or more of the relatively low density compressed vermicular graphite compacts or at least one of the compacts with additional vermicular graphite prior to the next compression step. It is in this step that the thermal and electrical characteristics of the final compressed structure are largely determined. For example, if it is desired to produce a structure having high electrical or thermal conductivity along one axis and low electrical or thermal conductivity along another axis, two or more graphite compacts are arranged such that the axes of compression are parallel. Final compression will therefore form a structure which is monolithic and without discernible boundary between the layers but which will have relatively high electrical conductivity along one axis and relatively low conductivity along another. Similarly, a structure may be prepared having different electrical and thermal conductive properties at different portions of its thickness. Such a structure is prepared, for example, by stacking two or more uniaxially compressed light weight compacts whose axes of compression are at right angles to one another. Final compression of such compacts will produce a monolithic structure having different electrical and thermal conducting properties at different points along its thickness. Likewise, as set forth hereinbefore, the graphite compact prepared in the first step may be contacted with a mass of uncohered, particulate vermicular graphite prior to the final compression.

Once arranged in the desired relationship to one another, the relatively low density compressed graphite compact and the additional vermicular graphite source material are further compressed into the final desired shape under a sufficient pressure to produce a cohered monolithic structure. The final shape of the graphite structure may be produced simply by compressing in a mold of the proper shape or, after final compression, the structure may be easily machined into any desired configuration. In this manner, large structures of substantially any size, shape or thickness may be prepared.

The actual force employed to produce good bond between compressed vermicular graphite structure within the above-defined ranges is usually at least 30 p.s.i. and preferably between 200 p.s.i. and 50,000 p.s.i. but such force will vary within this range depending upon the initial density of the graphite and upon the thickness of the graphite in the axis of compression. In general, a higher pressure is required to produce bonding between relatively high density structures than is required to bond relatively low density structures. Likewise, thin sections will bond more readily and at lower pressures than will thick sections. For example, even very large graphite compacts, having a relatively low density, i.e. near 0.01 gm./cc., are easily bonded together under a relatively low pressure, e.g. from 40 to 500 p.s.i. However, to produce good bonding between compacts having densities approaching 1.4 gm./cc. such compacts must be relatively thin foils preferably not exceeding 0.05 inch in thickness even if relatively high pressure, i.e. greater than about 5000 p.s.i. are applied.

The vermicular graphite employed herein is a compressible form of graphite generally described in French Patent No. 1,395,964. Such vermicular graphite is usually prepared by introducing an intercalating agent between the laminae of natural or synthetic graphite and expanding such treated graphite by heating. For example, a heat expandable graphite may be prepared by contacting graphite particles of from about 10 to 325 mesh with an intercalating agent such as fuming nitric acid, fuming sulfuric acid, mixtures of concentrated nitric and sulfuric acids, perhalo acids, and the like. The resulting treated graphite is expandable by heat and, if unconfined will increase in volume from about 20 to about 300 times or more upon heating. Such expanded graphite is usually in light weight, particulate, vermicular, worm-like form and is easily compressible into shaped monolithic structures. Such expanded material is sufficiently light and fluffy that it may have a bulk density of 0.005 gm./cc. or even less but upon sufficient compression may form a structure which approaches the theoretical density of graphite, i.e. 2.26 gm./cc.

One of the advantages of this process is readily recognized when it is considered that to produce a 1 inch thick graphite structure having a density of 1.85 gm./cc. from a typical vermicular graphite having a bulk density of 0.005 gm./cc., a volume change from 370 to 1 is required. This means that to obtain such a structure by the use of a compression piston the piston travels 369 inches or about 31 feet to produce such a structure in a single stroke. A piston stroke of greater than 100 inches is generally considered excessive from a mechanical standpoint, particularly, in instances where pressures in excess of 5000 p.s.i. are required.

The following examples will more fully illustrate the invention, but are not to be construed as limiting its scope thereto.

EXAMPLE 1

Into a rectangular chamber was placed ½ inch of vermicular graphite having a bulk density of 0.007 gm./cc. A piston then compressed the graphite to a density of 0.03 gm./cc. An additional ½ inch of vermicular graphite having a bulk density of 0.007 gm./cc. was added on top of the light weight compact. Again the piston compressed the vermicular graphite to a density of 0.03 gm./cc. This process was repeated until a rectangular structure one foot in thickness was produced which had a bulk density of 0.03 gm./cc. Additional pressure was then applied to the piston to compress the layers of partially compressed graphite into a compact having a density of about 1.0 gm./cc. The resulting rectangular graphite structure thus produced was monolithic with no visible joints.

EXAMPLE 2

In order to demonstrate the effect of the density of the intermediate compact upon the characteristics of the final structure, compacts of various densities were prepared in the manner of Example 1 using relatively low forming pressures. Two of the compacts of intermediate density were bonded together into a final integral unit by the application of a higher pressure thereon. In each run, the second compression force was applied at 90° from the first compression force to produce biaxial densification of the samples. The results are shown in the following table.

TABLE I

| | Intermediate compact | | Final compact | | |
|---|---|---|---|---|---|
| Run No. | Forming pressure (p.s.i.) | Density (gm./cc.) | Forming pressure (p.s.i.) | Density (gm./cc.) | Remarks |
| 1 | 2.95 | 0.0290 | 10,400 | 1.84 | Very good bonding and no visible joint. |
| 2 | 2.95 | 0.0287 | 10,400 | 1.86 | Do. |
| 3 | 31 | 0.141 | 10,400 | 1.86 | Acceptable bonding. |
| 4 | 31 | 0.150 | 10,400 | 1.81 | Do. |

EXAMPLE 3

By the process of Example 1, two rectangular blocks of compressed graphite having a density of 0.028 gm./cc. were prepared from vermicular graphite. These blocks were joined by pressure of 300 p.s.i. to form a monolithic structure having a density of 1.152 gm./cc. No joint was visible and the structure had substantially uniform strength throughout.

EXAMPLE 4

In order to demonstrate the applicability of the process to even larger structures and to further demonstrate the criticality of the density of the original compact made by the first compression, compressed graphite blocks about 12 inches thick (intermediate blocks) were produced by the general process of Example 1. Two blocks of about the same density were compressed together to form the final structure. The results are shown in Table II which follows.

TABLE II

| | Intermediate structure | | Final structure | | |
|---|---|---|---|---|---|
| Run No. | Block density (gm./cc.) | Joining pressure (p.s.i.) | Density (gm./cc.) | Total thickness (in.) | Remarks |
| 1 | 0.065 | 250 | 0.58 | 2.7 | Good handling. |
| 2 | 0.032 | 40 | 0.19 | 4.0 | Do. |

EXAMPLE 5

Sheets of graphite foil were prepared by compressing vermicular graphite uniaxially to produce foils of various densities and thicknesses. Such foils were then bonded to one another by passing two sheets of foil of the same density at a rate of 2.3 feet per minute between rollers which were 6 inches in diameter and 12 inches long. The pressure exerted on such foil was from about 400 to 4000 pounds per square inch depending on the initial thickness of the foil. The results are shown by the following tabulation:

| Number | Initial density (grams/cc.) | Initial foil thickness (inches) | Final foil density (grams/cc.) |
|---|---|---|---|
| 1 | 1.27 | 0.016 | 1.64 |
| 2 | 1.03 | 0.011 | 1.37 |
| 3 | 1.30 | 0.043 | 1.60 |

Numbers 1 and 2 bonded together to give an invisible joint and substantially uniform strength throughout the foil, however, number 3 bonded less and the joint line was visible due to its greater initial thickness.

In the same manner vermicular graphite was bonded to a graphite foil by applying a layer of vermicular graphite having a density of 0.005 gm./cc. to a foil of 0.013 inch thick and having a density of 0.97 gm./cc. The vermicular graphite layer was approximately 2.4 inches thick prior to passing between the rolls. After passing between the rolls the foil was 0.017 inch thick and had a density of 1.43 gm./cc. Such foil had a good unitary structure with no visible evidence of the bonded vermicular graphite on the surface.

EXAMPLE 6

Two layers of 0.02 inch thick graphite foil having a density of 1.4 gm./cc. were coiled around a smooth cylindrical mandril having a diameter of 1 inch. A closed rubber membrane was then placed on the outside of the foil. All air was removed by evacuation and 50,000 p.s.i. of isostatic pressure was applied by immersing the foil-covered mandril in a water-filled pressure vessel and applying pressure to the water. The compressed graphite was removed from the mandril and found to be a 1 inch I.D. tube having a density of 1.85 gm./cc. The interior of such tube had a mirror finish and the structure was monolithic containing no evidence of a joint between the bonded layers.

In another run, five layers of graphite foil were likewise bonded together to form a tube which was monolithic in structure.

EXAMPLE 7

A 2 inch diameter cylinder was filled with vermicular graphite having a density of 0.3 pound per cubic foot and was compressed along a longitudinal axis to form a cohered compact having a density of 0.7 gm./cc. The compact thus formed was removed from the cylinder and hydrostatically compressed within an evacuated membrane under 20,000 pounds of isostatic compression to yield a solid cylinder having a density of 1.74 gm./cc. and having relatively low thermal and electrical conductivity in the axial direction and having relatively high thermal and electrical conductivity in the radial direction. Such cylinder was then wrapped with five layers of a compressed graphite foil having a density of 1 gm./cc. The foil covered cylinder was then isostatically compressed to 30,000 p.s.i. to yield a monolithic cylinder having a density of 1.75 gm./cc. The unitary graphite structure has two orthogonal regions of high conductivity, i.e. an inner core having high radial conductivity and low axial conductivity and an outer skin having low radial and high axial conductivity. Bonding was excellent, however, between the foil layers and no joints were visible.

EXAMPLE 8

Rings of compressed vermicular graphite were prepared in a circular mold having an outside diameter of 6 inches. The mold was filled with vermicular graphite having a density of 0.005 gm./cc. and compression was applied with a metal piston. Sufficient pressure was applied to the vermicular graphite to produce rings 2 inches high and having a density of 0.025 gm./cc. A stack of 10 rings was radially compressed to a density of 0.547 gm./cc. under a pressure of 300 p.s.i. and then isostatically compressed to a pressure of 50,000 p.s.i., yielding a cylinder of compressed graphite having a density of 1.88 gm./cc. The cylinder that was produced showed no joints, had good structural strength and an axial resistivity of 187 microhm-inches.

Various modifications can be made in the present invention without departing from the spirit or scope thereof for it is understood that we limit ourselves only as defined in the appended claims.

We claim:
1. A process for the preparation of a graphite structure which comprises
   (a) compressing vermicular graphite to form a compact having a density in the range of from about 0.01 gm./cc. to about 0.27 gm./cc.,
   (b) contacting said graphite compact with additional vermicular graphite source material, and
   (c) subjecting said compact and additional vermicular graphite source material to a pressure of at least 30 p.s.i. so as to produce a monolithic structure having substantially no visible boundary between said compact and said additional vermicular graphite source material.

2. The process of claim 1 wherein the pressure is a force of between about 200 p.s.i. and 50,000 p.s.i.

3. The process of claim 1 wherein the additional vermicular graphite source material is at least one compact having a density of about 0.01 gm./cc. to about 0.27 gm./cc.

4. The process of claim 1 wherein the additional vermicular graphite source material is a collection of particulate vermicular graphite.

References Cited

UNITED STATES PATENTS

| 1,137,373 | 4/1915 | Aylsworth | 264—109 X |
| 1,510,745 | 10/1924 | Montgomery | 264—120 X |
| 2,155,875 | 4/1939 | Stemper | 156—62.8 |
| 3,114,930 | 12/1963 | Oldham et al. | 23—314 |
| 3,271,215 | 8/1966 | Hoffman | 156—62.8 |
| 3,404,061 | 10/1968 | Shane et al. | 264—109 |

ROBERT F. BURNETT, Primary Examiner

R. L. MAY, Assistant Examiner

U.S. Cl. X.R.

23—209.2; 156—62.8, 279